US012744159B2

(12) United States Patent
Hidaka et al.

(10) Patent No.: US 12,744,159 B2
(45) Date of Patent: Sep. 22, 2026

(54) MULTILAYER CERAMIC ELECTRONIC DEVICE

(71) Applicant: TDK Corporation, Tokyo (JP)

(72) Inventors: Yuuki Hidaka, Tokyo (JP); Shu Terada, Tokyo (JP); Hiroki Akiba, Tokyo (JP); Moeko Kakudo, Tokyo (JP); Tetsuhiro Takahashi, Tokyo (JP); Yuto Tomura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 142 days.

(21) Appl. No.: 18/962,150

(22) Filed: Nov. 27, 2024

(65) Prior Publication Data

US 2025/0210266 A1 Jun. 26, 2025

(30) Foreign Application Priority Data

Dec. 26, 2023 (JP) ................................ 2023-219727
Aug. 26, 2024 (JP) ................................ 2024-144470

(51) Int. Cl.

*H01G 4/12* (2006.01)
*H01G 4/10* (2006.01)
*H01G 4/224* (2006.01)
*H01G 4/30* (2006.01)

(52) U.S. Cl.

CPC ............ *H01G 4/1227* (2013.01); *H01G 4/10* (2013.01); *H01G 4/224* (2013.01); *H01G 4/30* (2013.01)

(58) Field of Classification Search

CPC ............ H01G 4/10; H01G 4/30; H01G 4/224; H01G 4/1227

See application file for complete search history.

(56) References Cited

U.S. PATENT DOCUMENTS

2012/0026642 A1 2/2012 Kaneko et al.
2012/0252657 A1* 10/2012 Sato ........................ H01G 4/30 336/200
2016/0042866 A1* 2/2016 Yao ..................... H01G 4/0085 361/301.4
2025/0210265 A1* 6/2025 Hidaka ................. H01G 4/008

FOREIGN PATENT DOCUMENTS

JP 2012-033556 A 2/2012

* cited by examiner

*Primary Examiner* — David M Sinclair
(74) *Attorney, Agent, or Firm* — Oliff PLC

(57) ABSTRACT

A multilayer ceramic electronic device includes an element body including a dielectric layer and an electrode layer laminated. The dielectric layer contains a main component represented by $ABO_3$. The dielectric layer contains above 0 mol and less than 0.050 mol Mn oxide in terms of MnO; 1.00 mol or more and 2.50 mol or less Mg oxide in terms of MgO; 0.50 mol or more and 1.50 mol or less R oxide in terms of $R_2O_3$, where R includes at least one of Y, Dy, Ho, Yb, Lu, Gd, and Tb; and 0.05 mol or more and 0.45 mol or less Zr oxide in terms of $ZrO_2$, with respect to 100 mol of the main component and further contains Si. The dielectric layer has a Zr/Mn ratio of 5.0 or more and 12.5 or less and a Zr/Si ratio of 0.40 or more and 0.80 or less in atomic ratio.

3 Claims, 2 Drawing Sheets

MULTILAYER CERAMIC ELECTRONIC DEVICE

TECHNICAL FIELD

The present invention relates to a multilayer ceramic electronic device.

BACKGROUND

Patent Document 1 discloses a multilayer ceramic electronic component having a structure in which, for example, a segregation phase containing Mg is formed in at least a part of an electrode missing portion. Having this structure, the multilayer ceramic electronic component with a high relative permittivity, less dielectric loss, and high reliability despite having a thin dielectric layer can be provided.

Patent Document 1: JP Patent Application Laid Open No. 2012-033556

SUMMARY

It is an object of the present invention to provide a multilayer ceramic electronic device with high thermal shock resistance.

To achieve the above object, a multilayer ceramic electronic device according to the present invention is a multilayer ceramic electronic device including:

an element body including a dielectric layer and an electrode layer being laminated, wherein the dielectric layer contains a main component represented by a formula $ABO_3$, where A includes only Ba or includes Ba and at least one selected from the group consisting of Ca and Sr, and B includes only Ti or includes Ti and at least one selected from the group consisting of Zr and Hf;

the dielectric layer contains above 0 mol and less than 0.050 mol Mn oxide in terms of MnO, 1.00 mol or more and 2.50 mol or less Mg oxide in terms of MgO, 0.50 mol or more and 1.50 mol or less R oxide in terms of $R_2O_3$, where R includes at least one selected from the group consisting of Y, Dy, Ho, Yb, Lu, Gd, and Tb, and 0.05 mol or more and 0.45 mol or less Zr oxide in terms of $ZrO_2$, with respect to 100 mol of the main component;

the dielectric layer further contains Si; and the dielectric layer has a Zr/Mn ratio of 5.0 or more and 12.5 or less in atomic ratio and a Zr/Si ratio of 0.40 or more and 0.80 or less in atomic ratio.

The dielectric layer may contain 0.05 mol or more and 0.25 mol or less V oxide in terms of $V_2O_5$ with respect to 100 mol of the main component.

A segregate containing Si may be provided at an interface between the electrode layer and the dielectric layer and in a region comprised of the dielectric layer; and a coverage ratio of the electrode layer may be 80% or more and 100% or less.

BRIEF DESCRIPTION OF THE DRAWING(S)

DETAILED DESCRIPTION

Figure 1:
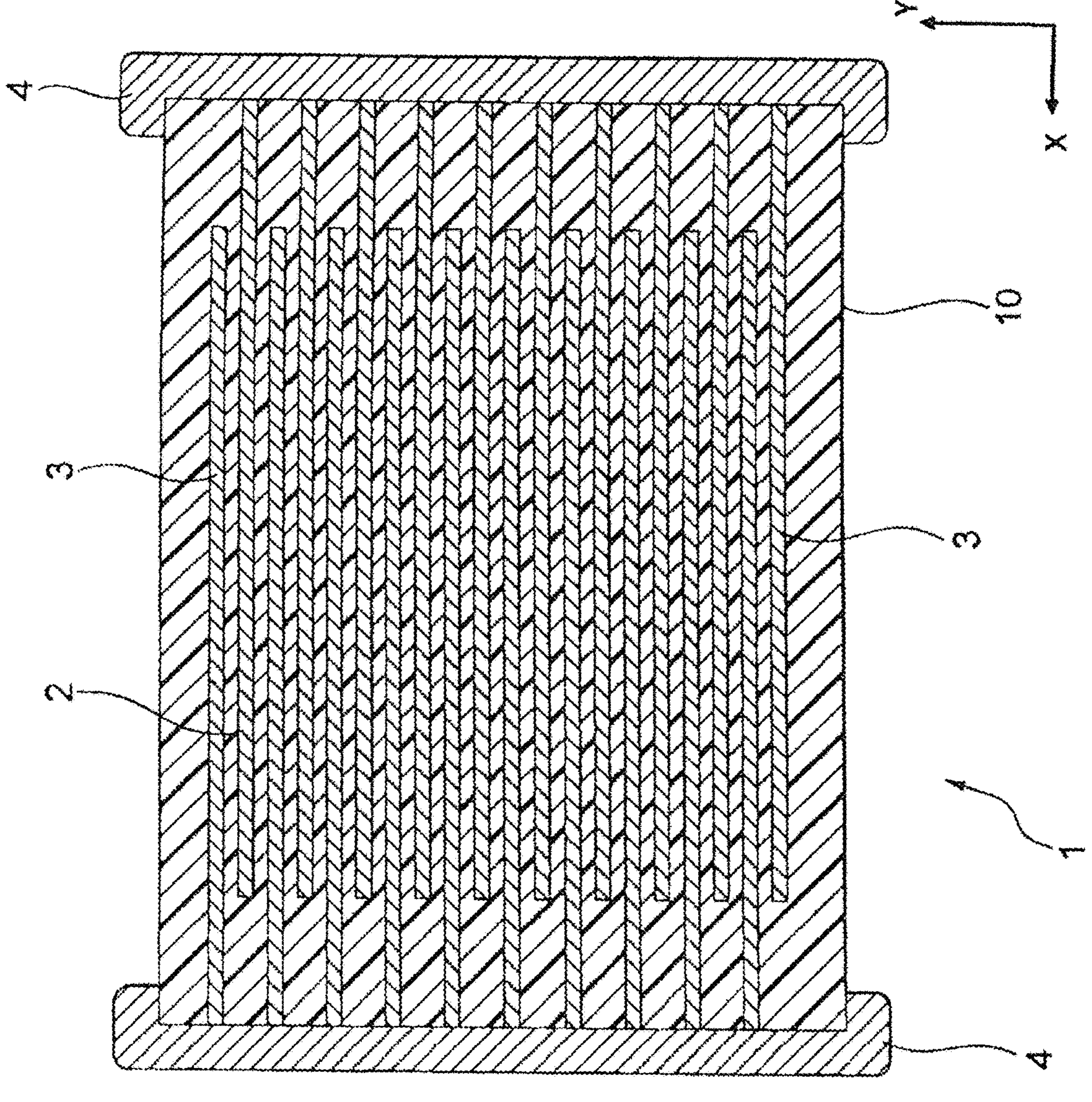
FIG. 1 is a sectional view of a multilayer ceramic capacitor according to one embodiment of the present invention.

The present invention is described below with reference to an embodiment illustrated in the drawings.

Multilayer Ceramic Capacitor 1

As shown in FIG. 1, a multilayer ceramic capacitor 1, which is an example multilayer ceramic electronic device according to one embodiment of the present invention, includes a capacitor element body 10 including dielectric layers 2 and internal electrode layers 3 alternately laminated. The internal electrode layers 3 are laminated so that their end surfaces are alternately exposed to surfaces of ends of the capacitor element body 10 facing each other. A pair of external electrodes 4 is provided at both ends of the capacitor element body 10 and is connected to the exposed end surfaces of the alternately arranged internal electrode layers 3 to form a capacitor circuit.

The capacitor element body 10 may have any shape but normally has a rectangular parallelepiped shape as shown in FIG. 1. The capacitor element body 10 may also have any dimensions; and the dimensions are appropriately determined according to usage.

Dielectric Layers 2

The dielectric layers 2 contain a main component represented by a formula $ABO_3$ (A includes only Ba or includes Ba and at least one selected from the group consisting of Ca and Sr; and B includes only Ti or includes Ti and at least one selected from the group consisting of Zr and Hf) and further contain a Mn oxide, a Mg oxide, an R oxide, and a Zr oxide. The dielectric layers 2 further contain Si. The dielectric layers 2 may further contain a V oxide.

In the present embodiment, oxides include complex oxides. For example, Mn oxides include a complex oxide of Mn and another element. The Mn oxide, the Mg oxide, the R oxide, the Zr oxide, and the V oxide may each be a simple oxide (oxide of a single metal element).

The dielectric layers 2 preferably contain barium titanate as a main component. Barium titanate is a compound represented by a composition formula $Ba_mTiO_{2+m}$, where m satisfies $0.995 \leq m \leq 1.010$. The following description is provided on the premise that the dielectric layers 2 contain barium titanate as a main component.

The Mn oxide content is above 0 mol and less than 0.050 mol in terms of MnO with respect to 100 mol of the main component. The Mn oxide content may be 0.010 mol or more and 0.045 mol or less. In a situation where the dielectric layers 2 do not contain the Mn oxide, segregates containing Si described later are less readily generated, and a coverage ratio described later is readily decreased. Consequently, the multilayer ceramic capacitor 1 has lower resistance to thermal shock (thermal shock resistance). In a situation where the dielectric layers 2 have too high a Mn oxide content, the segregates containing Si described later are less readily generated. Consequently, the multilayer ceramic capacitor 1 has lower resistance to thermal shock (thermal shock resistance).

The Mg oxide content is 1.00 mol or more and 2.50 mol or less in terms of MgO with respect to 100 mol of the main component. The Mg oxide content may be 1.50 mol or more and 2.00 mol or less. In a situation where the dielectric layers 2 have too low or too high a Mg oxide content, the multilayer ceramic capacitor 1 has lower resistance to thermal shock (thermal shock resistance). In particular, a Mg oxide content of less than 1.50 mol readily impairs sintering stability of the dielectric layers 2. A Mg oxide content of above 2.00 mol readily decreases relative permittivity of the dielectric layers 2.

The R oxide content is 0.50 mol or more and 1.50 mol or less in terms of $R_2O_3$ with respect to 100 mol of the main component. The R oxide content may be 0.60 mol or more and 1.20 mol or less. In a situation where the dielectric layers 2 have too low or too high an R oxide content, the multilayer ceramic capacitor 1 has lower resistance to thermal shock (thermal shock resistance). An R oxide content of less than 0.60 mol readily decreases reliability of the multilayer ceramic capacitor 1. An R oxide content of above 1.20 mol readily decreases insulation resistance of the dielectric layers 2.

R includes at least one selected from the group consisting of Y, Gd, Tb, Dy, Ho, Yb, and Lu. R preferably includes at least one selected from the group consisting of Y, Dy, and Ho or more preferably includes Y or Dy.

The Zr oxide content is 0.05 mol or more and 0.45 mol or less in terms of $ZrO_2$ with respect to 100 mol of the main component. The Zr oxide content may be 0.20 mol or more and 0.40 mol or less. In a situation where the dielectric layers 2 have too low or too high a Zr oxide content, the multilayer ceramic capacitor 1 has lower resistance to thermal shock (thermal shock resistance). Moreover, the lower the Zr oxide content, the less readily the segregates containing Si described later are generated.

The Si content is not limited. The Si content may be, for example, in terms of $SiO_2$, 0.10 mol or more and 0.90 mol or less, or 0.30 mol or more and 0.75 mol or less, with respect to 100 mol of the main component. How the dielectric layers 2 contain Si is also not limited. The dielectric layers 2 may contain Si as, for example, a Si oxide.

The V oxide content is not limited. The V oxide content may be, for example, in terms of $V_2O_5$, 0.03 mol or more and 0.30 mol or less, or 0.05 mol or more and 0.25 mol or less, with respect to 100 mol of the main component. In particular, a V oxide content of 0.05 mol or more and 0.25 mol or less further readily improves resistance to thermal shock (thermal shock resistance) of the multilayer ceramic capacitor 1 for decreasing internal stress generated at the time of firing.

Depending on intended properties, the dielectric layers 2 may further contain other components, i.e., components other than the main component, the Mn oxide, the Mg oxide, the R oxide, the Zr oxide, the V oxide, and Si. The content of the other components is not limited and may be within the extent that performance of the multilayer ceramic capacitor 1 is not significantly affected. The content of the other components may be, for example, 5 wt % or less in total with respect to the dielectric layers 2.

Preferably, the dielectric layers 2 substantially do not contain Al. Specifically, the Al content is preferably 0.1 mol or less (including 0 mol) in terms of $Al_2O_3$. Substantially non-inclusion of Al in the dielectric layers 2 readily improves thermal shock resistance.

The dielectric layers 2 have a Zr/Mn ratio of 5.0 or more and 12.5 or less in atomic ratio. In a situation where the Zr/Mn ratio is outside the above range, the multilayer ceramic capacitor 1 has lower resistance to thermal shock (thermal shock resistance). Moreover, in a situation where the Zr/Mn ratio is too small, the segregates containing Si described later are not readily generated in the dielectric layers 2.

The dielectric layers 2 have a Zr/Si ratio of 0.40 or more and 0.80 or less in atomic ratio. In a situation where the Zr/Si ratio is outside the above range, the multilayer ceramic capacitor 1 has lower resistance to thermal shock (thermal shock resistance). Moreover, in a situation where the Zr/Si ratio is too large, the segregates containing Si described later are not readily generated in the dielectric layers 2.

The dielectric layers 2 may have any thickness. In the present embodiment, $0.30 \leq t1 \leq 2.0$ may be satisfied, where t1 [μm] denotes the thickness (inter-layer thickness) of the dielectric layers 2. $0.35 \leq t1 \leq 1.8$ is preferably satisfied, or $0.40 \leq t1 \leq 1.5$ is more preferably satisfied. Having t1 being within the above range, the multilayer ceramic capacitor 1 readily has less withstand voltage failures or less short circuits and has larger capacitance.

The number of the dielectric layers 2 is not limited. In the present embodiment, the number of the dielectric layers 2 is preferably 20 or more, is more preferably 50 or more, or is most preferably 100 or more.

It is assumed that a reason why the above content ranges of the components of the dielectric layers 2 improve thermal shock resistance of the multilayer ceramic capacitor 1 is because, along with a decrease in the difference between coefficients of linear thermal expansion of the dielectric layers 2 and the internal electrode layers 3, variance of the coefficient of linear thermal expansion of the dielectric layers 2 decreases particularly in a temperature range of −55° C. to 150° C.

Internal Electrode Layers 3

The internal electrode layers 3 may contain any conductive material. Because a constituent material of the dielectric layers 2 has resistance to reduction, as the conductive material, a relatively inexpensive base metal material can be used. As a base metal material used as the conductive material, Ni or a Ni alloy is preferred. The Ni alloy is preferably an alloy of Ni and at least one element selected from the group consisting of Mn, Cr, Co, Cu, Sn, and Al. The Ni alloy has a Ni content of preferably 95 wt % or more. Note that the base metal material may contain approximately 0.1 wt % or less each of various trace components, such as P.

The internal electrode layers 3 may have any thickness. In the present embodiment, $0.30 \leq t2 \leq 1.0$ may be satisfied, where t2 [μm] denotes the thickness of the internal electrode layers 3. $0.30 \leq t2 \leq 0.80$ is preferably satisfied, or $0.30 \leq t2 \leq 0.60$ is more preferably satisfied. Having t2 being within the above range, the capacitor element body 10 readily has a smaller size, particularly a smaller height. Further, the coverage ratio described later is readily improved, and the multilayer ceramic capacitor 1 readily has larger capacitance.

Figure 2:
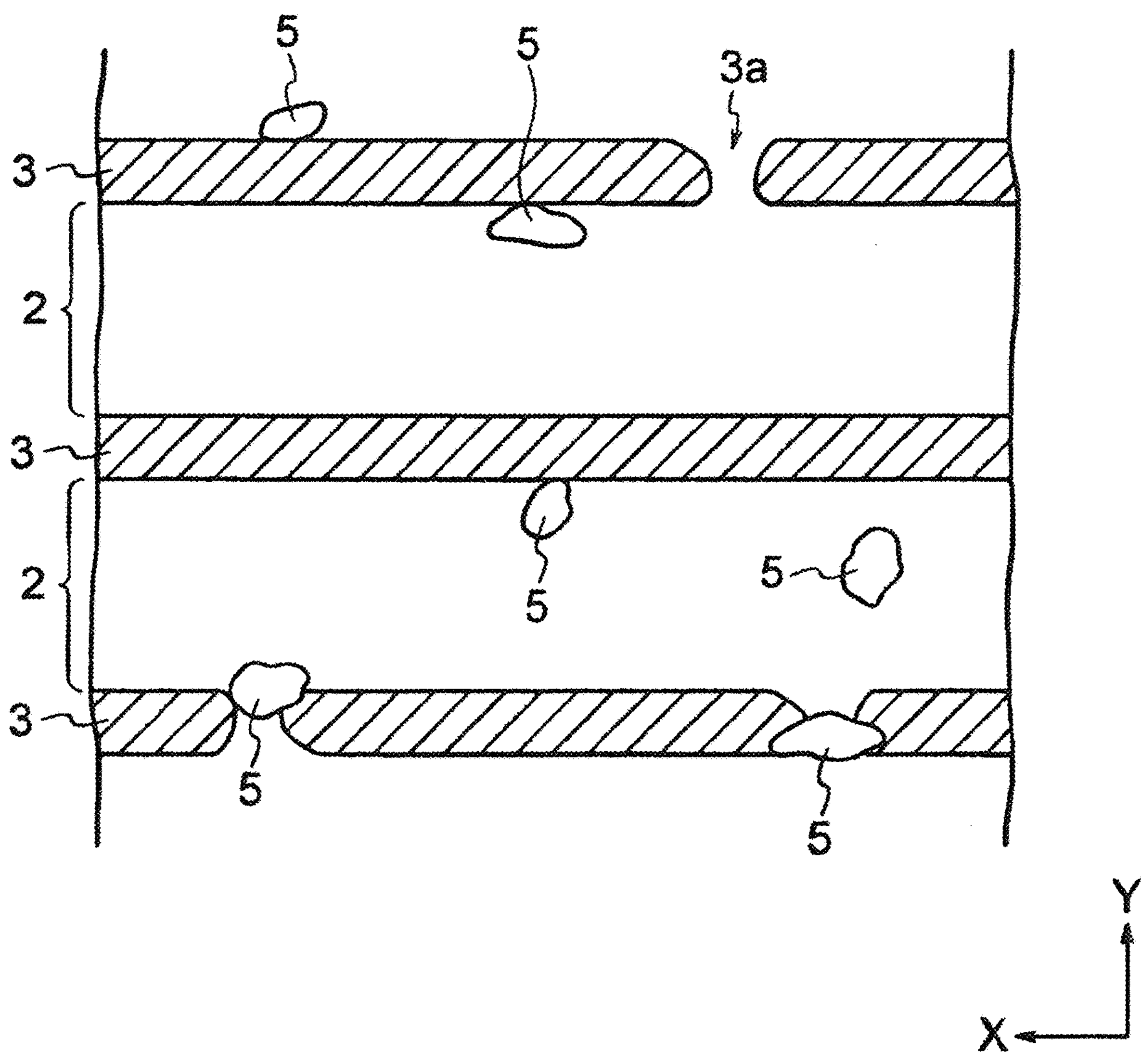
FIG. 2 is an enlarged schematic sectional view of a main part of FIG. 1.

As shown in FIG. 2, which shows the enlarged internal electrode layers 3, there may be portions (electrode discontinuous portions **3*a*) where no internal electrode is actually provided even though it should be provided there. The electrode discontinuous portions 3*a* are regions generated by the absence of the conductive material due to spaces being left between adjacent conductive particles (mainly Ni particles in a situation where Ni or the Ni alloy is used as the conductive material) during spheroidization of the conductive particles through particle growth at the time of firing. Note that, FIG. 2 is an enlarged schematic sectional view of the multilayer ceramic capacitor 1 shown in FIG. 1**. A field of view for checking the coverage ratio described later, the presence or absence of Si segregates, and the like may have any size large enough to check them. The size may be, for example, 2000 $\mu m^2$ or more. An image obtained through observation of the field of view may include one image having a large enough area or a plurality of images having a large enough area in total.

In the section shown in FIG. 2, some of the internal electrode layers 3 look discontinuous because of the electrode discontinuous portions 3*a*. However, the electrode discontinuous portions 3*a* are scattered on main surfaces of the internal electrode layers 3. Thus, even if the internal electrode layers 3 are discontinuous in the section shown in FIG. 2, they are continuous in other sections; and the internal electrode layers 3 are electrically connected.

In the section shown in FIG. 2, i.e., the section parallel to an X-Y plane in FIG. 2, the total of line lengths of regions actually provided with the internal electrode layers 3 and lengths of the electrode discontinuous portions 3*a* equals line lengths of regions where the internal electrode layers 3 should be provided. In the present embodiment, the ratio of the total of the line lengths of the regions actually provided with the internal electrode layers 3 to the total of the line lengths of the regions where the internal electrode layers 3 should be provided is defined as the coverage ratio of the electrode layers. It can be said that the coverage ratio of the electrode layers is the percentage of the internal electrode layers 3 covering the dielectric layers 2. The coverage ratio changes depending on the thickness of the dielectric layers 2 or the thickness of the internal electrode layers 3. Note that, when the coverage ratio is 100%, each internal electrode layer is present as one line without any electrode discontinuous portions 3*a*.

In the present embodiment, the coverage ratio may be 80% or more and 100% or less. The coverage ratio is preferably 85% or more and 100% or less, more preferably 90% or more and 100% or less, or most preferably 95% or more and 100% or less. The higher the coverage ratio, the fewer the electrode discontinuous portions 3*a*. Thus, particularly in a process of manufacturing the multilayer ceramic capacitor 1, water or a plating solution less readily enters the dielectric layers 2. Consequently, the multilayer ceramic capacitor 1 readily has improved resistance to thermal shock (thermal shock resistance). Note that, when the coverage ratio is 100%, there are no electrode discontinuous portions 3*a*.

The higher the coverage ratio and the fewer the electrode discontinuous portions 3*a*, the larger the electrode area of the multilayer ceramic capacitor 1 and the larger the capacitance of the multilayer ceramic capacitor 1. From that point as well, a high coverage ratio is preferred.

Segregation Phases 5

Segregation phases 5 are phases having a composition different from that of the dielectric layers 2 having barium titanate as their main component or the internal electrode layers 3. The multilayer ceramic capacitor 1 according to the present embodiment may include no segregation phases 5; however, as shown in FIG. 2, the multilayer ceramic capacitor 1 preferably includes segregation phases 5 containing Si.

FIG. 2 is an enlarged schematic sectional view of the multilayer ceramic capacitor 1 shown in FIG. 1.

Each segregation phase 5 containing Si may include an interface between one of the dielectric layers 2 and one of the internal electrode layers 3 or may entirely circumferentially be covered by one of the dielectric layers 2. The segregation phases 5 containing Si may contain elements other than Si. The multilayer ceramic capacitor 1 according to the present embodiment may include segregation phases 5 that do not contain Si. The segregation phases 5 containing Si may have any Si content. For example, segregation phases 5 having a Si content higher than that of the dielectric layers 2 by 10 at % or more may be deemed to be the segregation phases 5 containing Si.

In a situation where the multilayer ceramic capacitor 1 according to the present embodiment includes the segregation phases 5 containing Si (which may hereinafter be simply referred to as Si segregates), the Si segregates are preferably generated at interfaces between the internal electrode layers 3 and the dielectric layers 2 and in regions comprised of the dielectric layers 2. That is, the Si segregates are preferably generated in the dielectric layers 2 and/or at the interfaces between the internal electrode layers 3 and the dielectric layers 2.

By contrast, it may be that no Si segregates are generated at the electrode discontinuous portions 3*a*. Also, when the coverage ratio is 90% or more and 100% or less, the Si segregates are less readily generated at the electrode discontinuous portions 3*a*.

FIG. 2 shows three internal electrode layers 3. The following description is based on the supposition that all the segregation phases 5 shown in FIG. 2 are the Si segregates. The third internal electrode layer 3 counted from the top has two electrode discontinuous portions 3*a*, partly at which the respective Si segregates are generated.

One dielectric layer 2 between the second and third internal electrode layers 3 counted from the top in FIG. 2 is provided with one Si segregate entirely circumferentially covered by the dielectric layer 2. Such a Si segregate is the Si segregate located in the dielectric layer 2.

The other Si segregates in FIG. 2 partly overlap the interfaces between the dielectric layers 2 and the internal electrode layer 3. Such Si segregates are the Si segregates located at the interfaces between the dielectric layers and the internal electrode layers.

The multilayer ceramic capacitor 1 has particularly improved thermal shock resistance when satisfying both of the following: the Si segregates are generated at the interfaces between the internal electrode layers 3 and the dielectric layers 2 and in the regions comprised of the dielectric layers 2; and the coverage ratio is 90% or more and 100% or less. Also, the Si segregates are more preferably generated both in the dielectric layers 2 and at the above-mentioned interfaces. It is assumed that this is because, in this situation, internal stress generated at the interfaces is more readily mitigated, and structural defects are further less readily generated at the time of a thermal shock test.

External Electrodes 4

The external electrodes 4 may contain any conductive material. As a conductive material contained in the external electrodes 4, for example, Ni, Cu, a Ni alloy, or a Cu alloy, which are known, can be used. The external electrodes 4 may have any thickness; and the thickness is appropriately determined according to usage or the like. Normally, the external electrodes 4 have a thickness of preferably about 5 μm to about 50 μm.

Method of Manufacturing Multilayer Ceramic Capacitor 1

The multilayer ceramic capacitor 1 of the present embodiment is manufactured using a method similar to a method of manufacturing a conventional multilayer ceramic capacitor. Specifically, green chips are first prepared using a normal method involving a paste (e.g., a printing method or a sheet method). Then, the green chips are fired. To the fired green chips, external electrodes are printed or transferred; and then the external electrodes are baked. This completes the manufacture. This manufacturing method is specifically described below.

First, dielectric raw materials for forming the dielectric layers 2 are prepared. The prepared dielectric raw materials are turned into paint to give a dielectric layer paste. The dielectric layer paste may be organic paint or aqueous paint.

As the dielectric raw materials, a raw material of barium titanate, a raw material of the Mn oxide, a raw material of the Mg oxide, a raw material of the R oxide, a raw material of the Zr oxide, and a raw material of the Si oxide are prepared. To have the dielectric layers 2 contain the V oxide, a raw material of the V oxide is prepared as well. Examples of these raw materials can include, for example, a simple oxide of each element, a complex oxide of each element, or a mixture of them. Alternatively, the raw materials can be appropriately selected from various compounds (e.g., carbonates, oxalates, nitrates, hydroxides, and organic metal compounds of the elements) that become the above-mentioned simple oxide or complex oxide by firing, and the selected compounds can be mixed for use.

Note that, as the raw material of barium titanate, a raw material manufactured by various methods, such as a so-called solid phase method or a liquid phase method (e.g., an oxalate method, a hydrothermal synthesis method, an alkoxide method, or a sol-gel method) can be used.

In the present embodiment, the raw material of barium titanate has a BET specific surface area of preferably 6.0 $m^2/g$ or more in order to meet demand for thinner dielectric layers 2.

In a situation where the dielectric layers 2 are thinned, dielectric grains need to be disposed in between the internal electrode layers 3 in order to ensure sufficient reliability. To have the dielectric grains disposed in between the internal electrode layers 3, the dielectric grains are required to have a smaller average grain size. One way to decrease the average grain size of the dielectric grains may be decreasing the average particle size of the raw material of barium titanate. The average particle size of the raw material of barium titanate is in reciprocal proportion to the specific surface area of the raw material of barium titanate. Thus, the raw material of barium titanate has a BET specific surface area of preferably 6.0 $m^2/g$ or more.

In a situation where the dielectric layers 2 contain components other than the above components, raw materials of such components are prepared. Similarly to the above components, as the raw materials of such components, simple oxides of such components, complex oxides of such components, or a mixture of them can be used. Alternatively, various compounds that become the above simple oxides or complex oxides by firing can be used.

The amount of each compound in the dielectric raw materials is determined so that, after firing, the dielectric layers 2 have the composition described above. Before being turned into paint, the dielectric raw materials normally have an average particle size of about 0.05 μm to about 1 μm.

When the dielectric layer paste is to be organic paint, the dielectric raw materials and an organic vehicle are kneaded to give the organic paint. The organic vehicle is a mixture of an organic solvent and a binder dissolved therein. The binder may be of any type. The binder is appropriately selected from various binders (e.g., ethyl cellulose and polyvinyl butyral) normally used in this technical field. The organic solvent may be of any type. The organic solvent is appropriately selected from various organic solvents (e.g., terpineol, butyl carbitol, acetone, and toluene) according to a method of manufacturing the green chips.

When the dielectric layer paste is to be aqueous paint, the dielectric raw materials and an aqueous vehicle are kneaded to give the aqueous paint. The aqueous vehicle is a mixture of water and a water-soluble binder, dispersant, or the like dissolved therein. The water-soluble binder may be of any type. The water-soluble binder is appropriately selected from various water-soluble binders (e.g., polyvinyl alcohol, cellulose, and water-soluble acrylic resin) normally used in this technical field.

The following description is provided on the premise that the dielectric layer paste is organic paint.

Various conductive materials described above or various oxides, organic metal compounds, resinate, or the like that become the various conductive materials after firing and the organic vehicle described above are kneaded to give an internal electrode layer paste. The internal electrode layer paste may include an inhibitor. The inhibitor may be of any type. The inhibitor preferably has a composition similar to that of the main component.

An external electrode paste is prepared using a method similar to the method of forming the internal electrode layer paste.

Each of the pastes described above may have any organic vehicle content. The organic vehicle content is a normal content in this technical field. For example, each paste has a binder content of about 1 wt % to about 5 wt % and a solvent content of about 10 wt % to about 50 wt %. Each paste may further contain additives selected from various dispersants, plasticizers, dielectrics, insulators, and the like as necessary. Each paste has a total additive content of preferably 10 wt % or less.

When a printing method is used to give the green chips, the green chips are given by printing and laminating the dielectric layer paste and the internal electrode layer paste on substrates (e.g., PET), cutting the resultant product into a predetermined shape, and peeling the cut pieces off from the substrates.

When a sheet method is used to give the green chips, first, green sheets are formed with the dielectric layer paste, and the internal electrode layer paste is printed on the green sheets. Then, the green sheets having the internal electrode layer paste printed are laminated, and this laminate is cut into a predetermined shape to give the green chips.

Before firing described later, the green chips are subject to a binder removal treatment. Conditions of the binder removal treatment are not limited. The heating rate is preferably 5° C./hour to 300° C./hour. The holding temperature is preferably 180° C. to 400° C. The temperature holding time is preferably 0.5 hours to 24 hours. The binder removal atmosphere is preferably air or a reducing atmosphere.

The firing atmosphere for the green chips is preferably a reducing atmosphere. As an ambient gas for the reducing atmosphere, for example, a humidified mixed gas of $N_2$ and $H_2$ can be used. The oxygen partial pressure during firing can be appropriately determined according to the type of the conductive material in the internal electrode layer paste. When a base metal (e.g., Ni or a Ni alloy) is used as the conductive material in the internal electrode layer paste, the oxygen partial pressure is preferably $10^{-11}$ MPa to $10^{-8}$ MPa, and the heating rate is preferably 600° C./hour to 8000° C./hour or is more preferably 800° C./hour to 8000° C./hour.

Other conditions are preferably as follows. The holding temperature during firing is preferably 1300° C. or less or is more preferably 1000° C. to 1300° C. The temperature holding time during firing is preferably 0.2 hours to 8 hours or is more preferably 0.2 hours to 3 hours. In particular, the holding temperature during firing being within the above range prevents electrode disconnection due to abnormal sintering of the internal electrode layers 3 or a decrease in dielectric properties due to excessive grain growth of the dielectric grains while sufficiently readily densifying the dielectric layers 2. The cooling rate after firing is preferably 50° C./hour to 8000° C./hour.

After firing in the reducing atmosphere, the capacitor element bodies 10 are preferably subject to annealing. Annealing is a treatment for reoxidizing the dielectric layers 2. Annealing can remarkably extend the high-temperature load life of the multilayer ceramic capacitor 1.

The oxygen partial pressure of the annealing atmosphere is preferably $10^{-9}$ MPa to $10^{-5}$ MPa. The oxygen partial pressure within the above range prevents oxidation of the internal electrode layers 3 while sufficiently readily reoxidizing the dielectric layers 2.

The holding temperature during annealing is preferably 1100° C. or less or is more preferably 900° C. to 1100° C. The holding temperature during annealing being within the above range prevents oxidation of the internal electrode layers 3 while sufficiently readily reoxidizing the dielectric layers 2. Consequently, the multilayer ceramic capacitor 1 readily has suitable insulation resistance (IR), suitable high-temperature load life, and suitable capacitance.

Note that, while annealing normally includes a heating process, a temperature holding process, and a cooling process, annealing may include only the heating process and the cooling process. That is, the temperature holding time may be 0. In this situation, the holding temperature is equivalent to a maximum temperature.

Conditions of annealing other than the holding temperature are as follows. The temperature holding time during annealing is preferably 0 hours to 30 hours or is more preferably 1 hour to 25 hours. The cooling rate during annealing is preferably 50° C./hour to 500° C./hour or is more preferably 100° C./hour to 300° C./hour. The ambient gas for annealing is preferably, for example, a humidified $N_2$ gas.

In the binder removal treatment, firing, and annealing described above, any method of humidifying the $N_2$ gas, the mixed gas, or the like may be used. For example, a wetter is used for humidification. When a wetter or the like is used, the water temperature is preferably about 5° C. to about 75° C.

The binder removal treatment, firing, and annealing may be carried out continuously or independently.

End surfaces of the capacitor element bodies 10 given as above are polished, and the external electrode paste is applied there and is baked to form the external electrodes 4. Any method of polishing the end surfaces may be used. Examples of such methods include barrel polishing and sandblasting. Further, surfaces of the external electrodes 4 may be provided with a coating layer by plating or the like as necessary.

The multilayer ceramic capacitor 1 of the present embodiment manufactured in such a manner is mounted on a printed circuit board or the like by soldering or the like and is included in various electronics. In particular, the multilayer ceramic capacitor 1 is suitably included in on-board electronics or the like, which are required to have a small size, high performance, high reliability, and high thermal shock resistance.

Although one embodiment of the present invention has been described above, the present invention is not limited to the above embodiment and can be variously modified without departing from the gist of the present invention.

In the above embodiment, the multilayer ceramic capacitor 1 exemplifies a multilayer ceramic electronic device according to the present invention; however, the multilayer ceramic electronic device according to the present invention is not limited to the multilayer ceramic capacitor 1 and may be any other electronic device having the structure described above.

EXAMPLES

Hereinafter, the present invention is described based on further detailed examples; however, the present invention is not limited to these examples.

Experiment 1

A barium titanate powder ($BaTiO_3$ powder) having a BET specific surface area of 8.0 $m^2/g$ was prepared as a raw material of a main component. A MnO powder, a MgO powder, a $Dy_2O_3$ powder, a $ZrO_2$ powder, a $V_2O_5$ powder, and a $SiO_2$ powder were prepared as raw materials of subcomponents. In the present examples, R included Dy.

Then, the $BaTiO_3$ powder and the raw materials of the subcomponents prepared above were wet-pulverized in a ball mill for 15 hours and were dried to give a dielectric raw material. Note that, the amount of each subcomponent was controlled so that the subcomponent content of dielectric layers after firing was as shown in Table 1 with respect to 100 mol $BaTiO_3$ (main component).

Then, the resultant dielectric raw material (100 parts by weight), polyvinyl butyral resin (10 parts by weight), dioctyl phthalate (DOP) as a plasticizer (5 parts by weight), and alcohol as a solvent (100 parts by weight) were mixed in a ball mill and were turned into a paste to give a dielectric layer paste.

Separately from the dielectric layer paste, a Ni powder (44.6 parts by weight), terpineol (52 parts by weight), ethyl cellulose (3 parts by weight), and benzotriazole (0.4 parts by weight) were kneaded in a triple-roll mill and were turned into slurry to give an internal electrode layer paste.

Using the dielectric layer paste prepared using the method described above, green sheets were formed on PET films. Then, using the internal electrode layer paste, electrode layers, which eventually became internal electrode layers, were printed in a predetermined pattern on the green sheets. After the electrode layers were printed, the green sheets were peeled off from the PET films to give green sheets with the electrode layers. Then, the green sheets with the electrode layers were laminated and were adhered with pressure to give a green laminated body. This green laminated body was further cut into predetermined size to give green chips.

Then, the resultant green chips were subject to a binder removal treatment, firing, and annealing under the following conditions to give capacitor element bodies (sintered bodies).

As for the conditions of the binder removal treatment, the heating rate was 25° C./hour; the holding temperature was 260° C.; the temperature holding time was 8 hours; and the atmosphere was air.

As for the firing conditions, the heating rate was 800° C./hour; the holding temperature was 1100° C. to 1300° C.; and the temperature holding time was 1 hour. The cooling rate was 800° C./hour. The ambient gas was a humidified $N_2$+$H_2$ mixed gas (oxygen partial pressure was $10^{-10}$ MPa).

As for the annealing conditions, the heating rate was 200° C./hour; the holding temperature was 1000° C.; the temperature holding time was 2 hours; the cooling rate was 200°

C./hour; and the ambient gas was a humidified $N_2$ gas (oxygen partial pressure was $10^{-7}$ MPa).

To humidify the ambient gases used in firing and annealing, a wetter was used.

Then, end surfaces of the resultant capacitor element bodies were polished by sandblasting. After that, Cu was applied as external electrodes to give multilayer ceramic capacitor samples shown in FIG. 1. Each capacitor sample had a size of 3.2 mm×1.6 mm×0.6 mm. The thickness t1 of the dielectric layers and the thickness t2 of the internal electrode layers were both 0.50 μm. The number of the dielectric layers interposed between the internal electrode layers was 10.

Observation of segregation phases of the resultant capacitor samples and measurement of a coverage ratio, relative permittivity, dielectric loss (tan δ), and high-temperature load life thereof were carried out as follows.

Observation of Segregation Phases

First, the capacitor samples were cut in a plane perpendicular to the dielectric layers. Then, this section was observed with a SEM and was subject to a STEM-EDX analysis. From a result of Si element mapping, the presence or absence of Si segregates in the dielectric layers, at interfaces between the dielectric layers and the internal electrode layers, and at electrode discontinuous portions was checked. Specifically, the presence of a Si segregate entirely circumferentially covered by one of the dielectric layers was deemed to be the presence of a Si segregate in the dielectric layer. The presence of a Si segregate partially overlapping an interface between one of the dielectric layers and one of the internal electrode layers was deemed to be the presence of a Si segregate at the interface between the dielectric layer and the internal electrode layer. The presence of a Si segregate partially or entirely overlapping one of the electrode discontinuous portions was deemed to be the presence of a Si segregate at the electrode discontinuous portion. Table 1 shows the results. Note that, in the capacitor samples that did not include the Si segregates in the dielectric layers, at the interfaces between the dielectric layers and the internal electrode layers, or at the electrode discontinuous portions, no Si segregates were included in other portions of such capacitor samples.

Coverage Ratio

The section described above was observed with a SEM, and the coverage ratio was calculated from the resultant SEM picture. Specifically, the ratio of the total of line lengths of regions actually provided with the electrode layers to the total of line lengths of regions where the electrode layers should have been provided on the supposition that there were no electrode discontinuous portions in the internal electrode layers was calculated and was defined as the coverage ratio. A coverage ratio of 80% or more and 100% or less was deemed good. A coverage ratio of 90% or more and 100% or less was deemed better. Table 1 shows the results.

Thermal Shock Test

Three hundred capacitor samples were manufactured and were classified into three groups, each including one hundred capacitor samples. Capacitance, dielectric loss (tan δ), and insulation resistance (IR) of the capacitor samples were measured.

As for a first group of capacitor samples, −55° C./85° C. temperature cycling was repeated 3000 cycles. As for a second group of capacitor samples, −55° C./125° C. temperature cycling was repeated 3000 cycles. As for a third group of capacitor samples, −55° C./150° C. temperature cycling was repeated 3000 cycles.

Specifically, a process of holding the capacitor samples in a low temperature (−55° C.) chamber for 30 minutes and then in a high temperature (85° C., 125° C., or 150° C.) chamber for 30 minutes was repeated 3000 times.

Then, capacitance, dielectric loss (tan δ), and insulation resistance (IR) of the capacitor samples after temperature cycling were measured. A rate of change of capacitance, a rate of change of dielectric loss, and a rate of change of insulation resistance from before to after temperature cycling were calculated.

When the capacitor samples had all the rates of changes within 5% or less and had no structural defects (cracks or delamination) observed after temperature cycling, the capacitor samples were deemed to be good products. The capacitor samples other than the good products were deemed to be defective products. Table 1 shows the number of defective products in each group.

Capacitance of the capacitor samples was measured at a reference temperature of 25° C. with a digital LCR meter (4274A manufactured by YHP) at a frequency of 1 kHz and an input signal level (measurement voltage) of 1.0 Vrms. Dielectric loss (tan δ) of the capacitor samples was measured at a reference temperature of 25° C. with a digital LCR meter (4274A manufactured by YHP) at a frequency of 1 kHz and an input signal level (measurement voltage) of 0.5 Vrms. Insulation resistance was measured with a digital resistance meter (R8340 manufactured by ADVANTEST) at a measurement temperature of 25° C., a measurement voltage of 4 V, for a measurement time of 60 seconds. To check the presence or absence of structural defects, the capacitor samples were embedded in resin, and their sections were polished. In the resultant sections, the presence or absence of structural defects was checked with a 50× optical microscope.

As for the first group, the number of defective products being 0 was deemed good. That is, a defective percentage of less than 1% was deemed good. As for the second group, the number of defective products being less than 20 was deemed good; the number of defective products being less than 9 was deemed better; and the number of defective products being less than 5 was deemed best. That is, a defective percentage of less than 20% was deemed good; a defective percentage of less than 9% was deemed better; and a defective percentage of less than 5% was deemed best. As for the third group, the number of defective products being less than 30 was deemed good; the number of defective products being less than 18 was deemed better; and the number of defective products being less than 10 was deemed best. That is, a defective percentage of less than 30% was deemed good; a defective percentage of less than 18% was deemed better; and a defective percentage of less than 10% was deemed best.

TABLE 1

| No. | Example/ Comparative Example | Content: MnO (mol) | MgO (mol) | $R_2O_3$ (mol | $ZrO_2$ (mol) | $SiO_2$ (mol) | $V_2O_5$ (mol) | Zr/ Mn | Zr/ Si | Si segregate: Dielectric layer | Interface | Electrode discontinuous portion | Coverage ratio (%) | Thermal shocktest: −55° C. to 85° C. | −55° C. to 125° C. | −55° C. to 150° C. |
|---|---|---|---|---|---|---|---|---|---|---|---|---|---|---|---|---|
| 1 | Comparative Example | 0.000 | 1.75 | 1.00 | 0.05 | 0.10 | 0.03 | — | 0.50 | Absent | Absent | Absent | 78 | 3 | 25 | 37 |
| 2 | Example | 0.010 | 1.75 | 1.00 | 0.10 | 0.20 | 0.03 | 10.0 | 0.50 | Present | Present | Present | 87 | 0 | 15 | 21 |
| 3 | Example | 0.020 | 1.75 | 1.00 | 0.20 | 0.40 | 0.03 | 10.0 | 0.50 | Present | Present | Present | 88 | 0 | 13 | 24 |
| 4 | Example | 0.025 | 1.75 | 1.00 | 0.25 | 0.50 | 0.03 | 10.0 | 0.50 | Present | Present | Present | 86 | 0 | 12 | 26 |
| 5 | Example | 0.030 | 1.75 | 1.00 | 0.30 | 0.60 | 0.03 | 10.0 | 0.50 | Present | Present | Present | 89 | 0 | 17 | 23 |
| 6 | Example | 0.040 | 1.75 | 1.00 | 0.40 | 0.80 | 0.03 | 10.0 | 0.50 | Present | Present | Present | 87 | 0 | 15 | 22 |
| 7 | Example | 0.045 | 1.75 | 1.00 | 0.45 | 0.90 | 0.03 | 10.0 | 0.50 | Present | Present | Present | 88 | 0 | 12 | 21 |
| 8 | Comparative Example | 0.050 | 1.75 | 1.00 | 0.45 | 0.90 | 0.03 | 10.0 | 0.50 | Absent | Present | Present | 88 | 1 | 24 | 36 |

According to Table 1, when all the subcomponent contents were within predetermined ranges (e.g., the Mn oxide content was above 0 mol and less than 0.050 mol in terms of MnO) and the Zr/Mn ratio and the Zr/Si ratio were within predetermined ranges, the Si segregates were generated; the coverage ratio was high; and the results of the thermal shock test were good. By contrast, in Sample No. 1, in which no Mn oxide was contained, no Si segregates were generated, and the coverage ratio was too low. Consequently, the results of the thermal shock test were inferior to those of each Example. In Sample No. 8, in which the Mn oxide content was too high, no Si segregates were generated in the dielectric layers. Consequently, the results of the thermal shock test were inferior to those of each Example.

Experiment 2

Experiment 2 was conducted as in Sample No. 5 of Experiment 1 except that the Mg oxide content was changed. Table 2 shows the results.

TABLE 2

| No. | Example/ Comparative Example | Content: MnO (mol) | MgO (mol) | $R_2O_3$ (mol) | $ZrO_2$ (mol) | $SiO_2$ (mol) | $V_2O_5$ (mo) | Zr/ Mn | Zr/ Si | Si segregate: Dielectric layer | Interface | Electrode discontinuous portion | Coverage ratio (%) | Thermal shocktest: −55° C. to 85° C. | −55° C. to 125° C. | −55° C. to 150° C. |
|---|---|---|---|---|---|---|---|---|---|---|---|---|---|---|---|---|
| 9 | Comparative Example | 0.030 | 0.75 | 1.00 | 0.30 | 0.60 | 0.03 | 10.0 | 0.50 | Present | Present | Present | 87 | 1 | 29 | 39 |
| 10 | Example | 0.030 | 1.00 | 1.00 | 0.30 | 0.60 | 0.03 | 10.0 | 0.50 | Present | Present | Present | 88 | 0 | 12 | 25 |
| 11 | Example | 0.030 | 1.25 | 1.00 | 0.30 | 0.60 | 0.03 | 10.0 | 0.50 | Present | Present | Present | 86 | 0 | 12 | 21 |
| 12 | Example | 0.030 | 1.50 | 1.00 | 0.30 | 0.60 | 0.03 | 10.0 | 0.50 | Present | Present | Present | 89 | 0 | 15 | 22 |
| 5 | Example | 0.030 | 1.75 | 1.00 | 0.30 | 0.60 | 0.03 | 10.0 | 0.50 | Present | Present | Present | 89 | 0 | 17 | 23 |
| 13 | Example | 0.030 | 2.00 | 1.00 | 0.30 | 0.60 | 0.03 | 10.0 | 0.50 | Present | Present | Present | 87 | 0 | 12 | 21 |
| 14 | Example | 0.030 | 2.25 | 1.00 | 0.30 | 0.60 | 0.03 | 10.0 | 0.50 | Present | Present | Present | 85 | 0 | 15 | 24 |
| 15 | Example | 0.030 | 2.50 | 1.00 | 0.30 | 0.60 | 0.03 | 10.0 | 0.50 | Present | Present | Present | 88 | 0 | 12 | 26 |
| 16 | Comparative Example | 0.030 | 2.75 | 1.00 | 0.30 | 0.60 | 0.03 | 10.0 | 0.50 | Present | Present | Present | 86 | 1 | 22 | 33 |

According to Table 2, when all the subcomponent contents were within the predetermined ranges (e.g., the Mg oxide content was 1.00 mol or more and 2.50 mol or less in terms of MgO) and the Zr/Mn ratio and the Zr/Si ratio were within the predetermined ranges, the Si segregates were generated; the coverage ratio was high; and the results of the thermal shock test were good. By contrast, in both Sample No. 9, in which the Mg oxide content was too low, and Sample No. 16, in which the Mg oxide content was too high, the results of the thermal shock test were inferior to those of each Example.

Experiment 3

Experiment 3 was conducted as in Sample No. 5 of Experiment 1 except that the R (Dy) oxide content was changed. Table 3 shows the results.

TABLE 3

| No. | Example/ Comparative Example | Content: MnO (mol) | MgO (mol) | $R_2O_3$ (mol) | $ZrO_2$ (mol) | $SiO_2$ (mol) | $V_2O_5$ (mol) | Zr/ Mn | Zr/ Si | Si segregate: Dielectric layer | Interface | Electrode discontinuous portion | Coverage ratio (%) | Thermal shocktest: −55° C. to 85° C. | −55° C. to 125° C. | −55° C. to 150° C. |
|---|---|---|---|---|---|---|---|---|---|---|---|---|---|---|---|---|
| 17 | Comparative Example | 0.030 | 1.75 | 0.25 | 0.30 | 0.60 | 0.03 | 10.0 | 0.50 | Present | Present | Present | 86 | 2 | 21 | 34 |
| 18 | Example | 0.030 | 1.75 | 0.50 | 0.30 | 0.60 | 0.03 | 10.0 | 0.50 | Present | Present | Present | 89 | 0 | 12 | 23 |
| 19 | Example | 0.030 | 1.75 | 0.75 | 0.30 | 0.60 | 0.03 | 10.0 | 0.50 | Present | Present | Present | 87 | 0 | 14 | 21 |
| 5 | Example | 0.030 | 1.75 | 1.00 | 0.30 | 0.60 | 0.03 | 10.0 | 0.50 | Present | Present | Present | 89 | 0 | 17 | 22 |
| 20 | Example | 0.030 | 1.75 | 1.25 | 0.30 | 0.60 | 0.03 | 10.0 | 0.50 | Present | Present | Present | 88 | 0 | 13 | 24 |
| 21 | Example | 0.030 | 1.75 | 1.50 | 0.30 | 0.60 | 0.03 | 10.0 | 0.50 | Present | Present | Present | 88 | 0 | 11 | 25 |
| 22 | Comparative Example | 0.030 | 1.75 | 1.75 | 0.30 | 0.60 | 0.03 | 10.0 | 0.50 | Present | Present | Present | 87 | 2 | 22 | 35 |

According to Table 3, when all the subcomponent contents were within the predetermined ranges (e.g., the R (Dy) oxide content was 0.50 mol or more and 1.50 mol or less in terms of $R_2O_3$) and the Zr/Mn ratio and the Zr/Si ratio were within the predetermined ranges, the Si segregates were generated; the coverage ratio was high; and the results of the thermal shock test were good. By contrast, in both Sample No. 17, in which the R oxide content was too low, and Sample No. 22, in which the R oxide content was too high, the results of the thermal shock test were inferior to those of each Example.

Experiment 4

Capacitor samples of Sample Nos. 23 to 26 were manufactured as in Sample No. 5 of Experiment 1 except that the Mn oxide content, the Zr oxide content, and the Si oxide content were changed. The samples had the same Zr/Si ratio except for Sample No. 23, in which Zr was not contained. The samples had the same Zr/Mn ratio except for Sample No. 23, in which Zr was not contained, and Sample No. 26, in which the Zr oxide content was too high. Table 4 shows the results.

TABLE 4

| No. | Example/ Comparative Example | Content: MnO (mol) | MgO (mol) | $R_2O_3$ (mol) | $ZrO_2$ (mol) | $SiO_2$ (mol) | $V_2O_5$ (mol) | Zr/ Mn | Zr/ Si | Si segregate: Dielectric layer | Interface | Electrode discontinuous portion | Coverage ratio (%) | Thermal shocktest: −55° C. to 85° C. | −55° C. to 125° C. | −55° C. to 150° C. |
|---|---|---|---|---|---|---|---|---|---|---|---|---|---|---|---|---|
| 23 | Comparative Example | 0.030 | 1.75 | 1.00 | 0.00 | 0.60 | 0.03 | | | Present | Present | Present | 88 | 2 | 24 | 32 |
| 24 | Example | 0.005 | 1.75 | 1.00 | 0.05 | 0.10 | 0.03 | 10.0 | 0.50 | Present | Present | Present | 86 | 0 | 12 | 21 |
| 2 | Example | 0.010 | 1.75 | 1.00 | 0.10 | 0.20 | 0.03 | 10.0 | 0.50 | Present | Present | Present | 89 | 0 | 15 | 21 |
| 3 | Example | 0.020 | 1.75 | 1.00 | 0.20 | 0.40 | 0.03 | 10.0 | 0.50 | Present | Present | Present | 87 | 0 | 13 | 24 |
| 5 | Example | 0.030 | 1.75 | 1.00 | 0.30 | 0.60 | 0.03 | 10.0 | 0.50 | Present | Present | Present | 89 | 0 | 17 | 23 |
| 6 | Example | 0.040 | 1.75 | 1.00 | 0.40 | 0.80 | 0.03 | 10.0 | 0.50 | Present | Present | Present | 88 | 0 | 15 | 22 |
| 25 | Example | 0.045 | 1.75 | 1.00 | 0.45 | 0.90 | 0.03 | 10.0 | 0.50 | Present | Present | Present | 88 | 0 | 12 | 21 |
| 26 | Comparative Example | 0.045 | 1.75 | 1.00 | 0.50 | 1.00 | 0.03 | 11.0 | 0.50 | Present | Present | Present | 87 | 1 | 21 | 34 |

According to Table 4, in Sample Nos. 24 to 25, in which all the subcomponent contents were within the predetermined ranges and the Zr/Mn ratio and the Zr/Si ratio were within the predetermined ranges, the Si segregates were generated; the coverage ratio was high; and the results of the thermal shock test were good. By contrast, in both Sample No. 23, in which no Zr oxide was contained, and Sample No. 26, in which the Zr oxide content was too high, the results of the thermal shock test were inferior to those of each Example.

Experiment 5

Capacitor samples of Sample Nos. 27 to 33 were manufactured as in Sample No. 5 of Experiment 1 except that the Zr oxide content and the Si oxide content were changed as shown in Table 5. All the samples had the same Zr/Si ratio. Table 5 shows the results.

TABLE 5

| | | Content | | | | | | | | Si segregate | | | | Thermal shocktest | | |
|---|---|---|---|---|---|---|---|---|---|---|---|---|---|---|---|---|
| No. | Example/Comparative Example | MnO (mol) | MgO (mol) | $R_2O_3$ (mol) | $ZrO_2$ (mol) | $SiO_2$ (mol) | $V_2O_5$ (mol) | Zr/Mn | Zr/Si | Dielectric layer | Interface | Electrode discontinuous portion | Coverage ratio (%) | 55° C. to 85° C. | −55° C. to 125° C. | −55° C. to 150° C. |
| 27 | Comparative Example | 0.030 | 1.75 | 1.00 | 0.09 | 0.18 | 0.03 | 3.0 | 0.50 | Absent | Absent | Absent | 88 | 1 | 23 | 32 |
| 28 | Example | 0.030 | 1.75 | 1.00 | 0.15 | 0.30 | 0.03 | 5.0 | 0.50 | Present | Present | Present | 86 | 0 | 11 | 23 |
| 29 | Example | 0.030 | 1.75 | 1.00 | 0.21 | 0.42 | 0.03 | 7.0 | 0.50 | Present | Present | Present | 89 | 0 | 12 | 21 |
| 30 | Example | 0.030 | 1.75 | 1.00 | 0.27 | 0.54 | 0.03 | 9.0 | 0.50 | Present | Present | Present | 87 | 0 | 11 | 24 |
| 5 | Example | 0.030 | 1.75 | 1.00 | 0.30 | 0.60 | 0.03 | 10.0 | 0.50 | Present | Present | Present | 89 | 0 | 17 | 23 |
| 31 | Example | 0.030 | 1.75 | 1.00 | 0.33 | 0.66 | 0.03 | 11.0 | 0.50 | Present | Present | Present | 85 | 0 | 14 | 23 |
| 32 | Example | 0.030 | 1.75 | 1.00 | 0.38 | 0.75 | 0.03 | 12.5 | 0.50 | Present | Present | Present | 88 | 0 | 12 | 22 |
| 33 | Comparative Example | 0.030 | 1.75 | 1.00 | 0.45 | 0.90 | 0.03 | 15.0 | 0.50 | Present | Present | Present | 88 | 1 | 23 | 34 |

According to Table 5, in Sample Nos. 28 to 32, in which all the subcomponent contents were within the predetermined ranges and the Zr/Mn ratio and the Zr/Si ratio were within the predetermined ranges, the Si segregates were generated; the coverage ratio was high; and the results of the thermal shock test were good. By contrast, in Sample No. 27, in which all the subcomponent contents were within the predetermined ranges but the Zr/Mn ratio was too small, no Si segregates were generated, and the results of the thermal shock test were inferior to those of each Example. In Sample No. 33, in which all the subcomponent contents were within the predetermined ranges but the Zr/Mn ratio was too large, the results of the thermal shock test were inferior to those of each Example.

Experiment 6

Capacitor samples of Sample Nos. 34 to 39 were manufactured as in Sample No. 5 of Experiment 1 except that the Si oxide content was changed as shown in Table 6. Table 6 shows the results.

According to Table 6, in Sample Nos. 35 to 38, in which all the subcomponent contents were within the predetermined ranges and the Zr/Mn ratio and the Zr/Si ratio were within the predetermined ranges, the Si segregates were generated; the coverage ratio was high; and the results of the thermal shock test were good. By contrast, in Sample No. 34, in which all the subcomponent contents were within the predetermined ranges but the Zr/Si ratio was too small, the results of the thermal shock test were inferior to those of each Example. In Sample No. 39, in which all the subcomponent contents were within the predetermined ranges but the Zr/Si ratio was too large, no Si segregates were generated, and the results of the thermal shock test were inferior to those of each Example.

Experiment 7

Capacitor samples of Sample Nos. 40 to 45 were manufactured as in Sample No. 5 of Experiment 1 except that the V oxide content was changed as shown in Table 7. Table 7 shows the results.

TABLE 6

| | | Content | | | | | | | | Si segregate | | | | Thermal shocktest | | |
|---|---|---|---|---|---|---|---|---|---|---|---|---|---|---|---|---|
| No. | Example/Comparative Example | MnO (mol) | MgO (mol) | $R_2O_3$ (mol) | $ZrO_2$ (mol) | $SiO_2$ (mol) | $V_2O_5$ (mol) | Zr/Mn | Zr/Si | Dielectric layer | Interface | Electrode discontinuous portion | Coverage ratio (%) | −55° C. to 85° C. | −55° C. to 125° C. | −55° C. to 150° C. |
| 34 | Comparative Example | 0.030 | 1.75 | 1.00 | 0.30 | 1.50 | 0.03 | 10.0 | 0.20 | Present | Present | Present | 88 | 2 | 24 | 35 |
| 35 | Example | 0.030 | 1.75 | 1.00 | 0.30 | 0.75 | 0.03 | 10.0 | 0.40 | Present | Present | Present | 87 | 0 | 12 | 22 |
| 5 | Example | 0.030 | 1.75 | 1.00 | 0.30 | 0.60 | 0.03 | 10.0 | 0.50 | Present | Present | Present | 89 | 0 | 17 | 23 |
| 36 | Example | 0.030 | 1.75 | 1.00 | 0.30 | 0.50 | 0.03 | 10.0 | 0.60 | Present | Present | Present | 88 | 0 | 14 | 22 |
| 37 | Example | 0.030 | 1.75 | 1.00 | 0.30 | 0.43 | 0.03 | 10.0 | 0.70 | Present | Present | Present | 86 | 0 | 12 | 24 |
| 38 | Example | 0.030 | 1.75 | 1.00 | 0.30 | 0.38 | 0.03 | 10.0 | 0.80 | Present | Present | Present | 89 | 0 | 12 | 21 |
| 39 | Comparative Example | 0.030 | 1.75 | 1.00 | 0.30 | 0.30 | 0.03 | 10.0 | 1.00 | Absent | Absent | Absent | 87 | 2 | 23 | 34 |

TABLE 7

| No. | Example/ Comparative Example | MnO (mol) | MgO (mol) | $R_2O_3$ (mol) | $ZrO_2$ (mol) | $SiO_2$ (mol) | $V_2O_5$ (mol) | Zr/ Mn | Zr/ Si | Si segregate Dielectric layer | Si segregate Interface | Si segregate Electrode discontinuous portion | Coverage ratio (%) | Thermal shocktest −55° C. to 85° C. | Thermal shocktest −55° C. to 125° C. | Thermal shocktest −55° C. to 150° C. |
|---|---|---|---|---|---|---|---|---|---|---|---|---|---|---|---|---|
| 5 | Example | 0.030 | 1.75 | 1.00 | 0.30 | 0.60 | 0.03 | 10.0 | 0.50 | Present | Present | Present | 89 | 0 | 17 | 23 |
| 40 | Example | 0.030 | 1.75 | 1.00 | 0.30 | 0.60 | 0.05 | 10.0 | 0.50 | Present | Present | Present | 87 | 0 | 7 | 14 |
| 41 | Example | 0.030 | 1.75 | 1.00 | 0.30 | 0.60 | 0.10 | 10.0 | 0.50 | Present | Present | Present | 88 | 0 | 6 | 15 |
| 42 | Example | 0.030 | 1.75 | 1.00 | 0.30 | 0.60 | 0.15 | 10.0 | 0.50 | Present | Present | Present | 88 | 0 | 8 | 17 |
| 43 | Example | 0.030 | 1.75 | 1.00 | 0.30 | 0.60 | 0.20 | 10.0 | 0.50 | Present | Present | Present | 87 | 0 | 6 | 12 |
| 44 | Example | 0.030 | 1.75 | 1.00 | 0.30 | 0.60 | 0.25 | 10.0 | 0.50 | Present | Present | Present | 88 | 0 | 7 | 14 |
| 45 | Example | 0.030 | 1.75 | 1.00 | 0.30 | 0.60 | 0.30 | 10.0 | 0.50 | Present | Present | Present | 86 | 0 | 14 | 22 |

According to Table 7, in Sample Nos. 40 to 45, in which all the subcomponent contents were within the predetermined ranges and the Zr/Mn ratio and the Zr/Si ratio were within the predetermined ranges, the Si segregates were generated; the coverage ratio was high; and the results of the thermal shock test were good. Moreover, in Sample Nos. 40 to 44, in which the V oxide content was 0.05 mol or more and 0.25 mol or less in terms of $V_2O_5$, the results of the thermal shock test were better than those of Sample Nos. 5 and 45, which were carried out substantially as in Sample Nos. 40 to 44 except that the V oxide content was less than 0.05 mol or above 0.25 mol.

Experiment 8

Capacitor samples of Sample Nos. 41a to 41c and 46 to 49 were manufactured as in Sample No. 41 of Experiment 7 except that the coverage ratio was changed by changing the thickness t2 of the internal electrode layers by changing the electrode printing thickness. Table 8 shows the results.

TABLE 8

| No. | Example/ Comparative Example | MnO (mol) | MgO (mol) | $R_2O_3$ (mol) | $ZrO_2$ (mol) | $SiO_2$ (mol) | $V_2O_5$ (mol) | Zr/ Mn | Zr/ Si | Si segregate Dielectric layer | Si segregate Interface | Si segregate Electrode discontinuous portion | Coverage ratio (%) | Thermal shocktest −55° C. to 85° C. | Thermal shocktest −55° C. to 125° C. | Thermal shocktest −55° C. to 150° C. |
|---|---|---|---|---|---|---|---|---|---|---|---|---|---|---|---|---|
| 41a | Example | 0.030 | 1.75 | 1.00 | 0.30 | 0.60 | 0.10 | 10.0 | 0.50 | Present | Present | Present | 80 | 0 | 9 | 19 |
| 41b | Example | 0.030 | 1.75 | 1.00 | 0.30 | 0.60 | 0.10 | 10.0 | 0.50 | Present | Present | Present | 83 | 0 | 9 | 18 |
| 41c | Example | 0.030 | 1.75 | 1.00 | 0.30 | 0.60 | 0.10 | 10.0 | 0.50 | Present | Present | Present | 85 | 0 | 7 | 15 |
| 41 | Example | 0.030 | 1.75 | 1.00 | 0.30 | 0.60 | 0.10 | 10.0 | 0.50 | Present | Present | Present | 88 | 0 | 6 | 15 |
| 46 | Example | 0.030 | 1.75 | 1.00 | 0.30 | 0.60 | 0.10 | 10.0 | 0.50 | Present | Present | Absent | 92 | 0 | 4 | 8 |
| 47 | Example | 0.030 | 1.75 | 1.00 | 0.30 | 0.60 | 0.10 | 10.0 | 0.50 | Present | Present | Absent | 96 | 0 | 2 | 6 |
| 48 | Example | 0.030 | 1.75 | 1.00 | 0.30 | 0.60 | 0.10 | 10.0 | 0.50 | Present | Present | Absent | 97 | 0 | 3 | 6 |
| 49 | Example | 0.030 | 1.75 | 1.00 | 0.30 | 0.60 | 0.10 | 10.0 | 0.50 | Present | Present | Absent | 98 | 0 | 3 | 6 |

According to Table 8, in Sample Nos. 41, 41c, and 46 to 49, in which the coverage ratio was 85% or more and 100% or less, the results of the thermal shock test were better than those of Sample Nos. 41a and 41b, in which the coverage ratio was 80% or more and less than 85%. Moreover, in Sample Nos. 46 to 49, in which the coverage ratio was 90% or more and 100% or less and no Si segregates were generated at the electrode discontinuous portions, the results of the thermal shock test were still better than those of Sample Nos. 41 and 41a to 41c, in which the coverage ratio was 80% or more and less than 90% and the Si segregates were generated at the electrode discontinuous portions. That is, in Sample Nos. 46 to 49, the Si segregates were generated in the dielectric layers and at the interfaces (interfaces between the dielectric layers and the internal electrode layers); the coverage ratio was high; and the results of the thermal shock test were good.

Experiment 9

Capacitor samples of Sample No. 50 were manufactured as in Sample No. 4 of Experiment 1 except that the Zr oxide content was changed as shown in Table 9. Further, capacitor samples of Sample No. 51 were manufactured as in Sample No. 50 except that the Mn oxide content and the Si oxide content were changed as shown in Table 9 so that the Zr/Mn ratio and the Zr/Si ratio were the same as those of Sample No. 4. Table 9 shows the results.

TABLE 9

| No. | Example/Comparative Example | Content MnO (mol) | MgO (mol) | $R_2O_3$ (mol) | $ZrO_2$ (mol) | $SiO_2$ (mol) | $V_2O_5$ (mol) | Zr/Mn | Zr/Si | Si segregate Dielectric layer | Interface | Electrode discontinuous portion | Coverage ratio (%) | Thermal shocktest −55° C. to 85° C. | −55° C. to 125° C. | −55° C. to 150° C. |
|---|---|---|---|---|---|---|---|---|---|---|---|---|---|---|---|---|
| 4 | Example | 0.025 | 1.75 | 1.00 | 0.25 | 0.50 | 0.03 | 10.0 | 0.50 | Present | Present | Present | 86 | 0 | 12 | 26 |
| 50 | Comparative Example | 0.025 | 1.75 | 1.00 | 0.02 | 0.50 | 0.03 | 0.80 | 0.04 | Absent | Absent | Present | 84 | 3 | 28 | 35 |
| 51 | Comparative Example | 0.002 | 1.75 | 1.00 | 0.02 | 0.04 | 0.03 | 10.0 | 0.50 | Absent | Absent | Absent | 85 | 2 | 30 | 38 |

According to Table 9, in both Sample Nos. 50 and 51, in which the Zr oxide content was too low, no Si segregates were generated in the dielectric layers, and the results of the thermal shock test were inferior to those of Sample No. 4. Note that, in Sample No. 51, no Si segregates were generated also at the electrode discontinuous portions.

REFERENCE NUMERALS

1 . . . multilayer ceramic capacitor
2 . . . dielectric layer
3 . . . internal electrode layer
3*a* . . . electrode discontinuous portion
4 . . . external electrode
5 . . . segregation phase
10 . . . capacitor element body

What is claimed is:

1. A multilayer ceramic electronic device comprising:

an element body comprising a dielectric layer and an electrode layer being laminated, wherein the dielectric layer comprises a main component represented by a formula $ABO_3$, where A comprises only Ba or comprises Ba and at least one selected from the group consisting of Ca and Sr, and B comprises only Ti or comprises Ti and at least one selected from the group consisting of Zr and Hf;

the dielectric layer comprises above 0 mol and less than 0.050 mol Mn oxide in terms of MnO, 1.00 mol or more and 2.50 mol or less Mg oxide in terms of MgO, 0.50 mol or more and 1.50 mol or less R oxide in terms of $R_2O_3$, where R comprises at least one selected from the group consisting of Y, Dy, Ho, Yb, Lu, Gd, and Tb, and 0.05 mol or more and 0.45 mol or less Zr oxide in terms of $ZrO_2$, with respect to 100 mol of the main component;

the dielectric layer further comprises Si; and the dielectric layer has a Zr/Mn ratio of 5.0 or more and 12.5 or less in atomic ratio and a Zr/Si ratio of 0.40 or more and 0.80 or less in atomic ratio.

2. The multilayer ceramic electronic device according to claim 1, wherein the dielectric layer comprises 0.05 mol or more and 0.25 mol or less V oxide in terms of $V_2O_5$ with respect to 100 mol of the main component.

3. The multilayer ceramic electronic device according to claim 1, wherein a segregate comprising Si is provided at an interface between the electrode layer and the dielectric layer and in a region comprised of the dielectric layer; and a coverage ratio of the electrode layer is 80% or more and 100% or less.

* * * * *